United States Patent
Kitamura et al.

(10) Patent No.: US 9,176,524 B2
(45) Date of Patent: Nov. 3, 2015

(54) ELECTRONIC APPARATUS

(75) Inventors: Tomoko Kitamura, Ome (JP); Toshikazu Shiroishi, Hamura (JP); Seiji Hashimoto, Ome (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 976 days.

(21) Appl. No.: 13/296,546

(22) Filed: Nov. 15, 2011

(65) Prior Publication Data

US 2012/0206884 A1 Aug. 16, 2012

(30) Foreign Application Priority Data

Feb. 14, 2011 (JP) ................................. 2011-028703

(51) Int. Cl.
*H05K 7/00* (2006.01)
*G06F 1/16* (2006.01)

(52) U.S. Cl.
CPC ............ *G06F 1/1601* (2013.01); *G06F 1/1637* (2013.01)

(58) Field of Classification Search
CPC .............................. G06F 1/1601; G06F 1/1637
See application file for complete search history.

(56) References Cited

U.S. PATENT DOCUMENTS

| | | | |
|---|---|---|---|
| 5,844,774 A | 12/1998 | Gushiken et al. | |
| 6,064,565 A | 5/2000 | Ishihara et al. | |
| 6,212,067 B1 | 4/2001 | Nakajima et al. | |
| 6,430,039 B2 | 8/2002 | Nakajima et al. | |
| 6,957,085 B2 | 10/2005 | Shin et al. | |
| 6,989,986 B2 | 1/2006 | Kumagai et al. | |
| 7,606,023 B2 | 10/2009 | Konno et al. | |
| 7,630,199 B2 | 12/2009 | Shigenobu et al. | |
| 2001/0001591 A1 | 5/2001 | Nakajima et al. | |
| 2002/0151328 A1 | 10/2002 | Shin et al. | |
| 2004/0184224 A1 | 9/2004 | Kumagai et al. | |
| 2007/0285878 A1 | 12/2007 | Konno et al. | |
| 2007/0293005 A1 | 12/2007 | Shigenobu et al. | |
| 2011/0013347 A1 | 1/2011 | Kinjou | |

FOREIGN PATENT DOCUMENTS

| | | |
|---|---|---|
| EP | 1 249 888 A2 | 10/2002 |
| EP | 1 249 888 A3 | 1/2004 |
| JP | 09-283946 A | 10/1997 |
| JP | 10-124171 A | 5/1998 |
| JP | 11-85319 A | 3/1999 |
| JP | 2002-215269 A | 7/2002 |
| JP | 2002-312070 | 10/2002 |
| JP | 2007-328613 A | 12/2007 |
| JP | 2008-003714 A | 1/2008 |

(Continued)

OTHER PUBLICATIONS

Decision of Rejection mailed by Japan Patent Office on Oct. 2, 2012 in corresponding Japanese patent application No. 2012-114162.

(Continued)

*Primary Examiner* — Ramon Barrera
(74) *Attorney, Agent, or Firm* — Knobbe, Martens, Olson & Bear LLP

(57) ABSTRACT

According to one embodiment, an electronic apparatus includes a hinge, a member attached to the hinge, and a housing. The housing accommodates the member and includes a wall configured to support the member and a portion configured to support the member from a side opposite to the wall.

8 Claims, 14 Drawing Sheets

(56) References Cited

FOREIGN PATENT DOCUMENTS

| | | |
|---|---|---|
| JP | 2008-083982 A | 4/2008 |
| JP | 2011-022769 A | 2/2011 |
| WO | WO 03/009263 A1 | 1/2003 |
| WO | WO 2008/114400 A1 | 9/2008 |

OTHER PUBLICATIONS

Notice of Reasons for Rejection mailed by Japan Patent Office on Jul. 10, 2012 in the corresponding Japanese patent application No. 2012-114162.

Notice of Reasons for Rejection mailed by Japan Patent Office on Jan. 31, 2012 in the corresponding Japanese patent application No. 2011-028703.

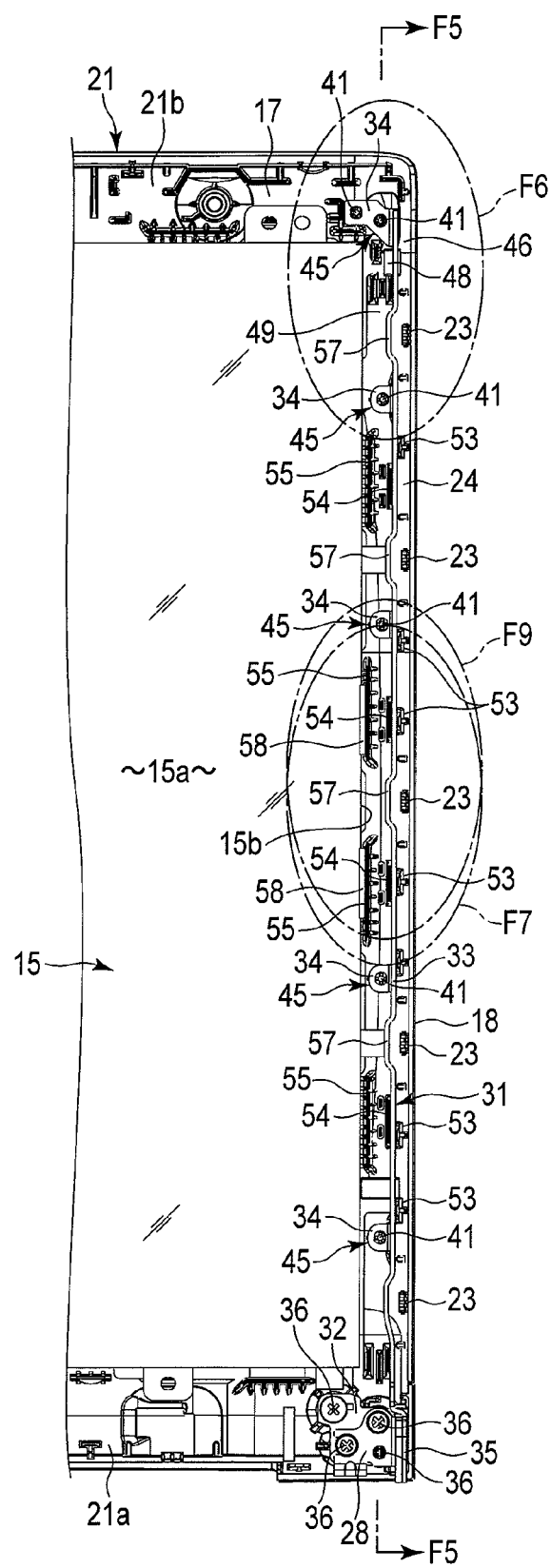
F I G. 3

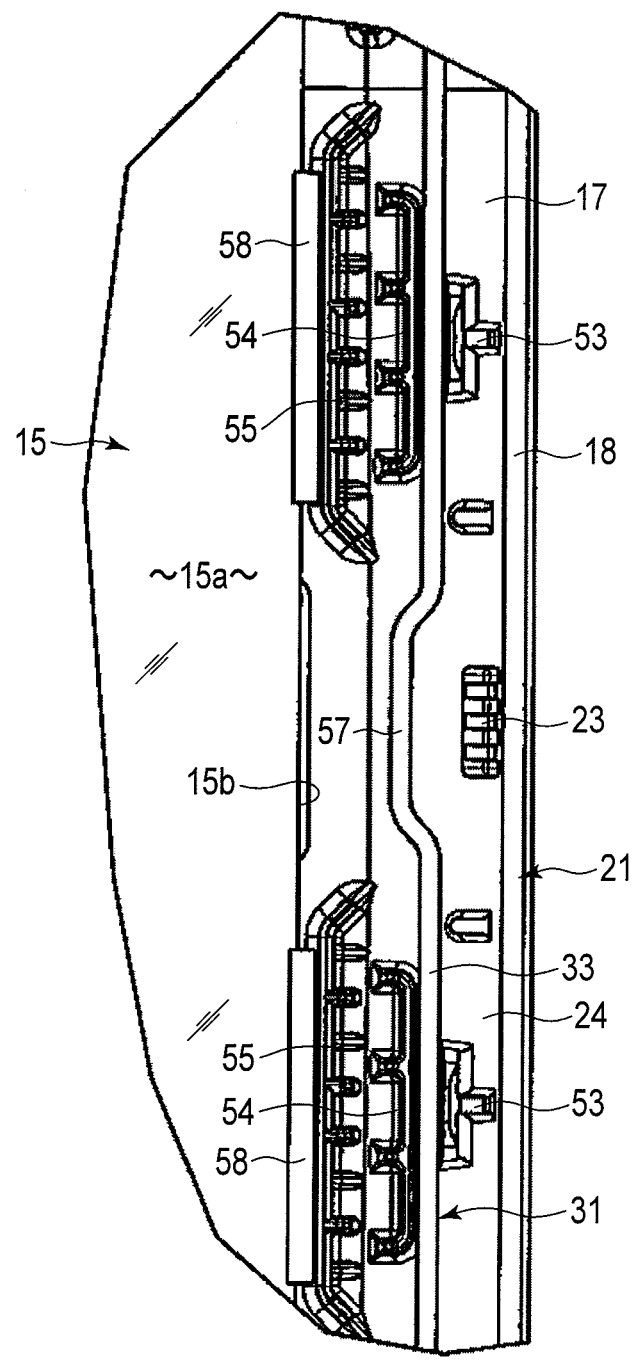
F I G. 7

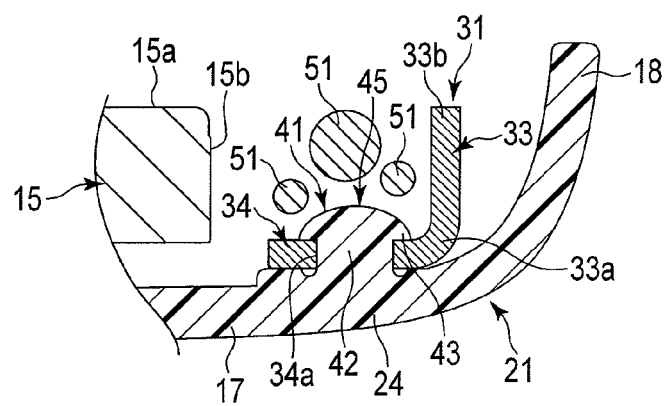
F I G. 11
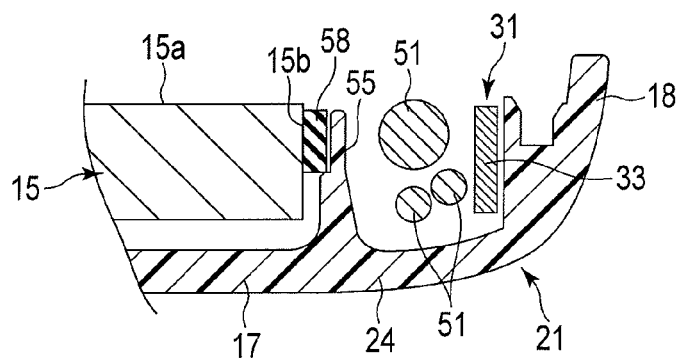
F I G. 12
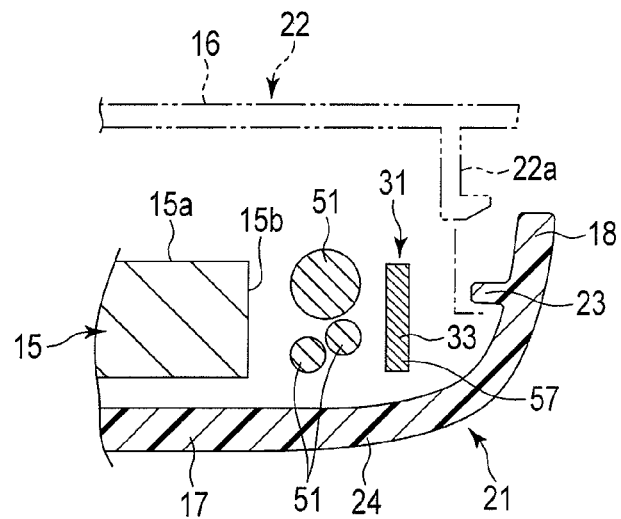
F I G. 13

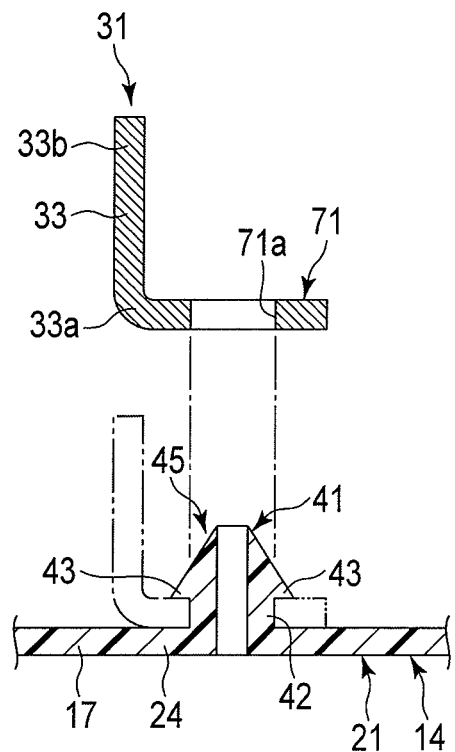
F I G. 14
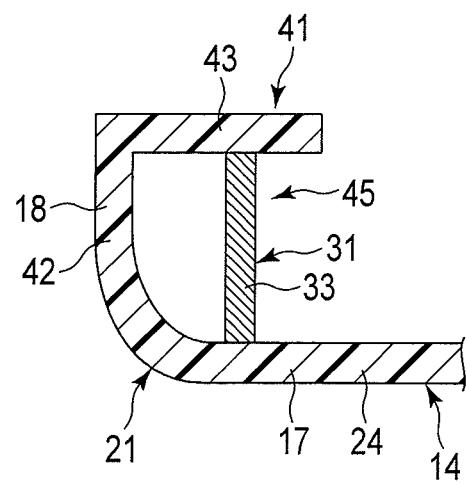
F I G. 15

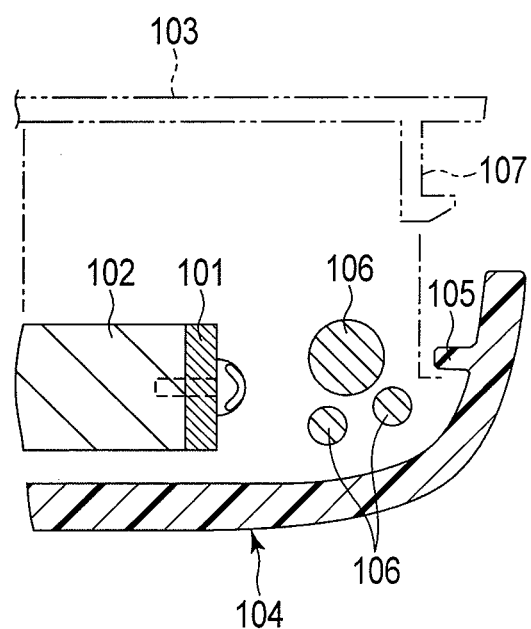
F I G. 19

ELECTRONIC APPARATUS

CROSS-REFERENCE TO RELATED APPLICATIONS

This application is based upon and claims the benefit of priority from prior Japanese Patent Application No. 2011-028703, filed Feb. 14, 2011, the entire contents of which are incorporated herein by reference.

FIELD

Embodiments described herein relate generally to an electronic apparatus including a hinge.

BACKGROUND

There are electronic apparatuses in which a main unit and a display unit are attached by a hinge. In some cases, a metal member attached to the hinge is provided in the housing of such an electronic apparatus.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary enlarged plan view illustrating part of the inside of the display unit of the electronic apparatus illustrated in FIG. 1;

FIG. 7 is an exemplary plan view illustrating a region of the inside of the display unit surrounded by the line F7 in FIG. 3;

FIG. 11 is an exemplary cross-sectional view of the inside of the display unit taken along the line F11-F11 in FIG. 8;

FIG. 12 is an exemplary cross-sectional view of the inside of the display unit taken along the line F12-F12 in FIG. 8;

FIG. 13 is an exemplary cross-sectional view of the inside of the display unit taken along the line F13-F13 in FIG. 8;

FIG. 14 is an exemplary cross-sectional view illustrating a first modification of the electronic apparatus according to one embodiment;

FIG. 15 is an exemplary cross-sectional view illustrating a second modification of the electronic apparatus according to one embodiment;

FIG. 19 is an exemplary cross-sectional view illustrating a structure related to the electronic apparatus illustrated in FIG. 1.

DETAILED DESCRIPTION

Various embodiments will be described hereinafter with reference to the accompanying drawings.

In general, according to one embodiment, an electronic apparatus comprises a hinge, a member attached to the hinge, and a housing. The housing accommodates the member and comprises a wall configured to support the member and a portion configured to support the member from a side opposite to the wall.

Hereinafter, embodiments will be described with reference to the drawings.

FIGS. 1 to 13 illustrate an electronic apparatus 1 according to one embodiment. The electronic apparatus 1 is a notebook type portable computer (note PC). The electronic apparatus, to which the present embodiment can be applied, is not limited to the notebook PC. The present embodiment can be broadly applied to various electronic apparatuses, such as a cellular phone, a smart phone, an electronic-book reader, a personal digital assistant (PDA), and a game machine.

Figure 1:
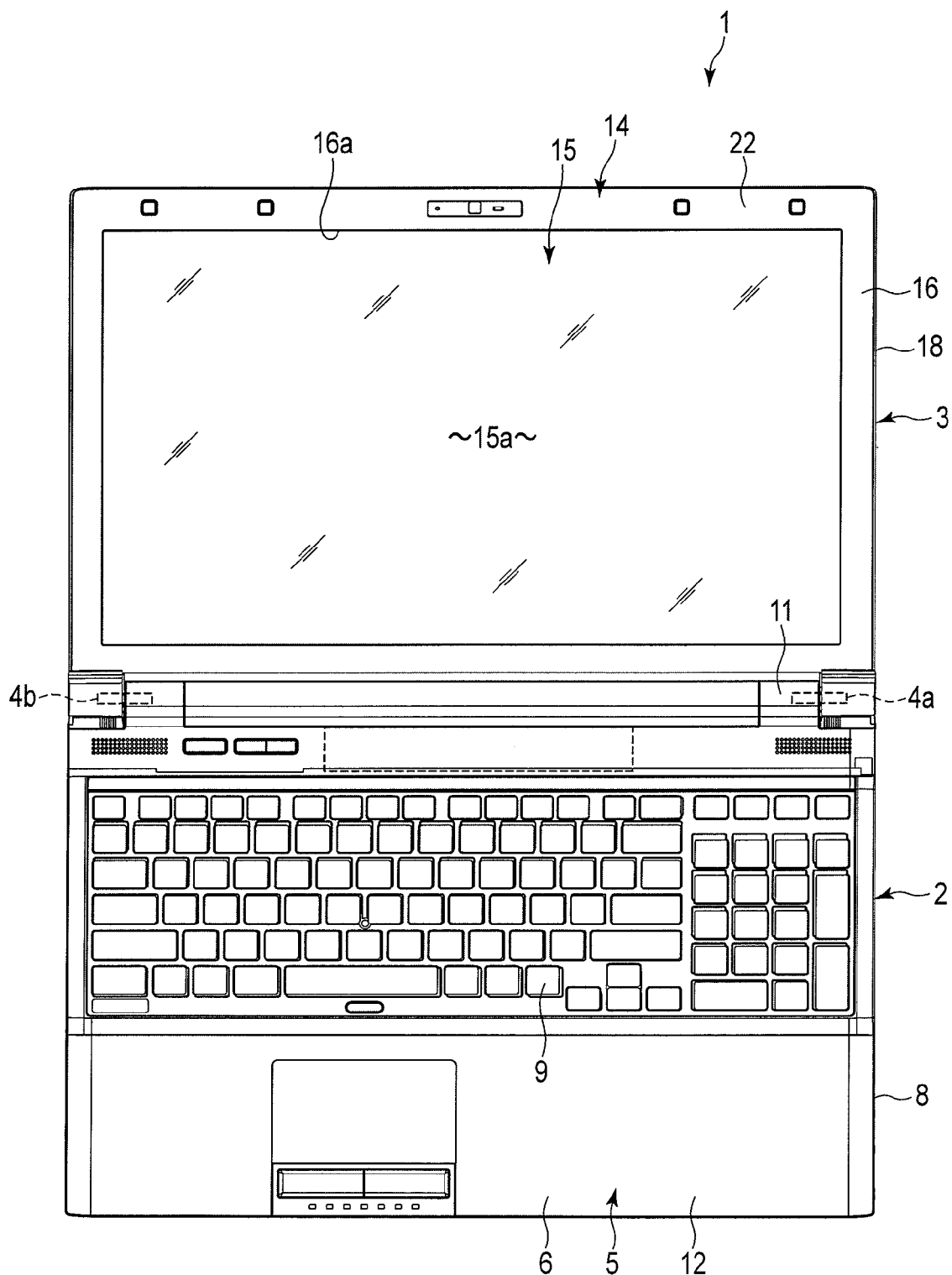
FIG. 1 is an exemplary plan view of an electronic apparatus according to one embodiment.

As illustrated in FIG. 1, the electronic apparatus 1 includes a main unit 2 (a first unit), a display unit 3 (a second unit), and hinges 4a and 4b. The main unit 2 is an electronic apparatus body having a main board mounted therein. The main unit 2 includes a first housing 5. The first housing 5 includes an upper wall 6, a lower wall (not shown), and a circumferential wall 8. The first housing 5 has a flat box-like shape.

The lower wall faces a desk surface when the electronic apparatus 1 is placed on a desk. The upper wall 6 extends substantially in parallel to the lower wall with a space between the lower wall and the upper wall 6. The circumferential wall 8 stands on the lower wall and connects the peripheral portion of the lower wall and the peripheral portion of the upper wall 6. A keyboard 9 is attached to the upper wall 6.

The first housing 5 includes a rear end portion 11 (a first end portion) and a front end portion 12 (a second end portion). The display unit 3 is attached to the rear end portion 11 by the hinges 4a and 4b. The front end portion 12 is opposite to the rear end portion 11.

As illustrated in FIG. 1, the display unit 3 includes a second housing 14 and a display device 15 accommodated in the second housing 14. The display device 15 is an example of a "module." The "module" is not limited to the above example but may be various modules appropriately accommodated in the electronic apparatus. The display device 15 is a liquid crystal display, for example, but is not limited to this. The display device 15 includes a display screen 15a on which images and videos are displayed.

The second housing 14 is pivotably (openably) attached to the rear end portion 11 of the first housing 5 by the hinges 4a and 4b. In this way, the display unit 3 can pivot between a first position where it overlaps the main unit 2 and a second position where it stands on the main unit 2.

The second housing 14 includes a front wall 16, a back wall 17, and a circumferential wall 18. The front wall 16 faces the main unit 2 when the display unit 3 is at the first position. The front wall 16 includes an opening 16a through which the display screen 15a of the display device 15 is exposed. In other words, the second housing 14 can pivot between the first position where the display screen 15a is covered by the first housing 5 and the second position where the display screen 15a is exposed.

The back wall 17 extends substantially in parallel to the front wall 16 with a space between the front wall 16 the back wall 17. The back wall 17 faces the display device 15 from a side opposite to the front wall 16. The circumferential wall 18 stands with respect to the back wall 17 and connects the peripheral portion of the front wall 16 and the peripheral portion of the back wall 17.

The second housing 14 includes a cover 21 and a mask 22 (see FIG. 13). The mask 22 includes the front wall 16. The cover 21 includes the back wall 17 and the circumferential wall 18. The mask 22 is an example of a "first member" and faces the display device 15. The cover 21 is an example of a "second member" and faces the display device 15 from a side opposite to the mask 22. The mask 22 is combined with the cover 21 to thereby form the second housing 14. The cover 21 and the mask 22 are formed of plastics, for example.

As illustrated in FIGS. 3 and 13, an engaging portion 23 is formed at an end portion of the cover 21. The engaging portion 23 engages with an engaging portion 22a of the mask 22. The engaging portion 22a of the mask 22 is a hook, for example. The engaging portion 23 of the cover 21 is a claw portion (a fitting claw) that receives a hook, for example.

The back wall 17 is an example of a "first wall." The circumferential wall 18 is an example of a "second wall" and is an example of a "standing wall" that stands with respect to the back wall 17. The circumferential wall 18 extends so as to bend from the edge portion of the back wall 17. The back wall 17 and the circumferential wall 18 are continuous in a curved surface shape, for example, and there is no distinct boundary between them. In other words, the cover 21 includes a wall 24 in which the back wall 17 and the circumferential wall 18 are combined. The leading end of the circumferential wall 18 makes contact with the mask 22.

Figure 8:
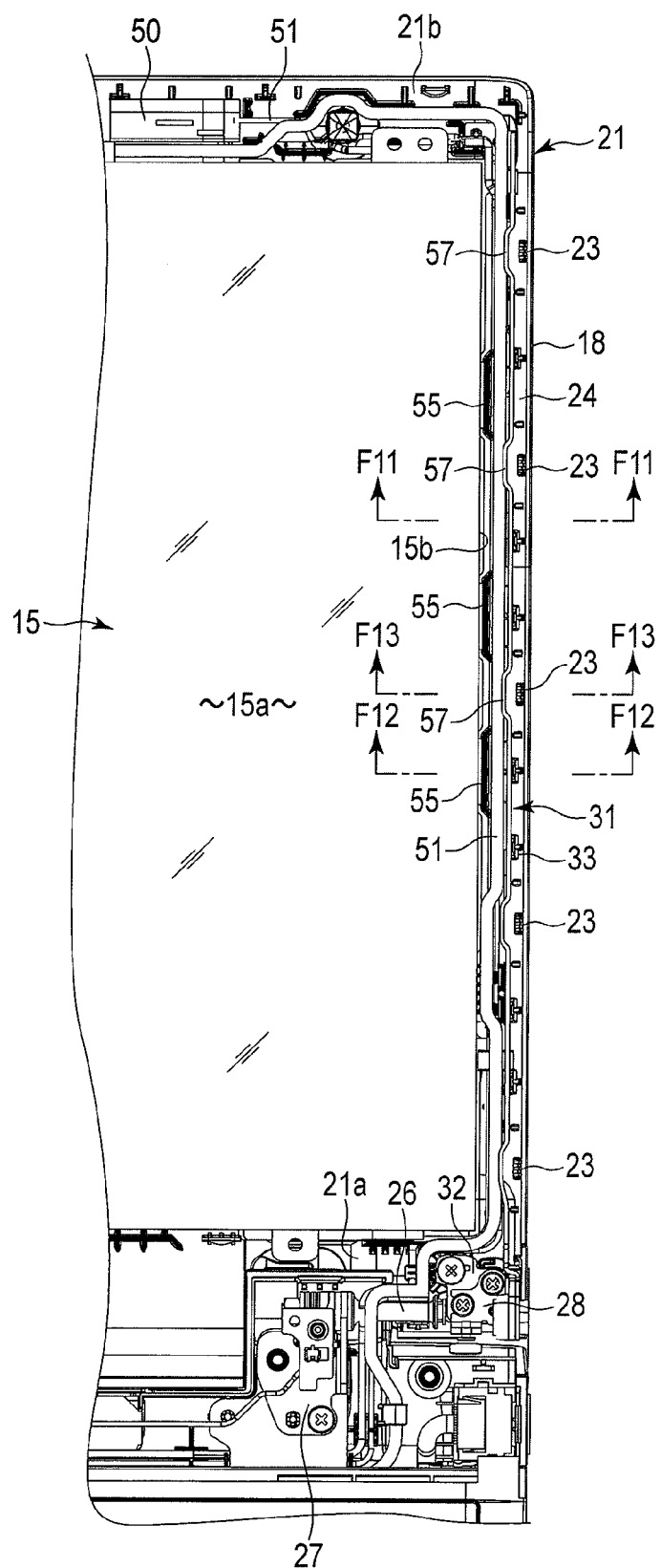
FIG. 8 is an exemplary plan view illustrating a state where a cable is attached to the inside of the display unit illustrated in FIG. 3.

The hinges 4a and 4b are attached to the first and second housings 5 and 14 (see FIG. 8). The hinges 4a and 4b include a hinge shaft 26 and first and second brackets 27 and 28. The first bracket 27 is a main unit fixing metal member and is pivotably attached to the hinge shaft 26 and fixed to the first housing 5. The second bracket 28 is a display unit fixing metal member and is attached to the hinge shaft 26 and the second housing 14.

Next, a supporting metal member 31 will be described in detail.

Figure 2:
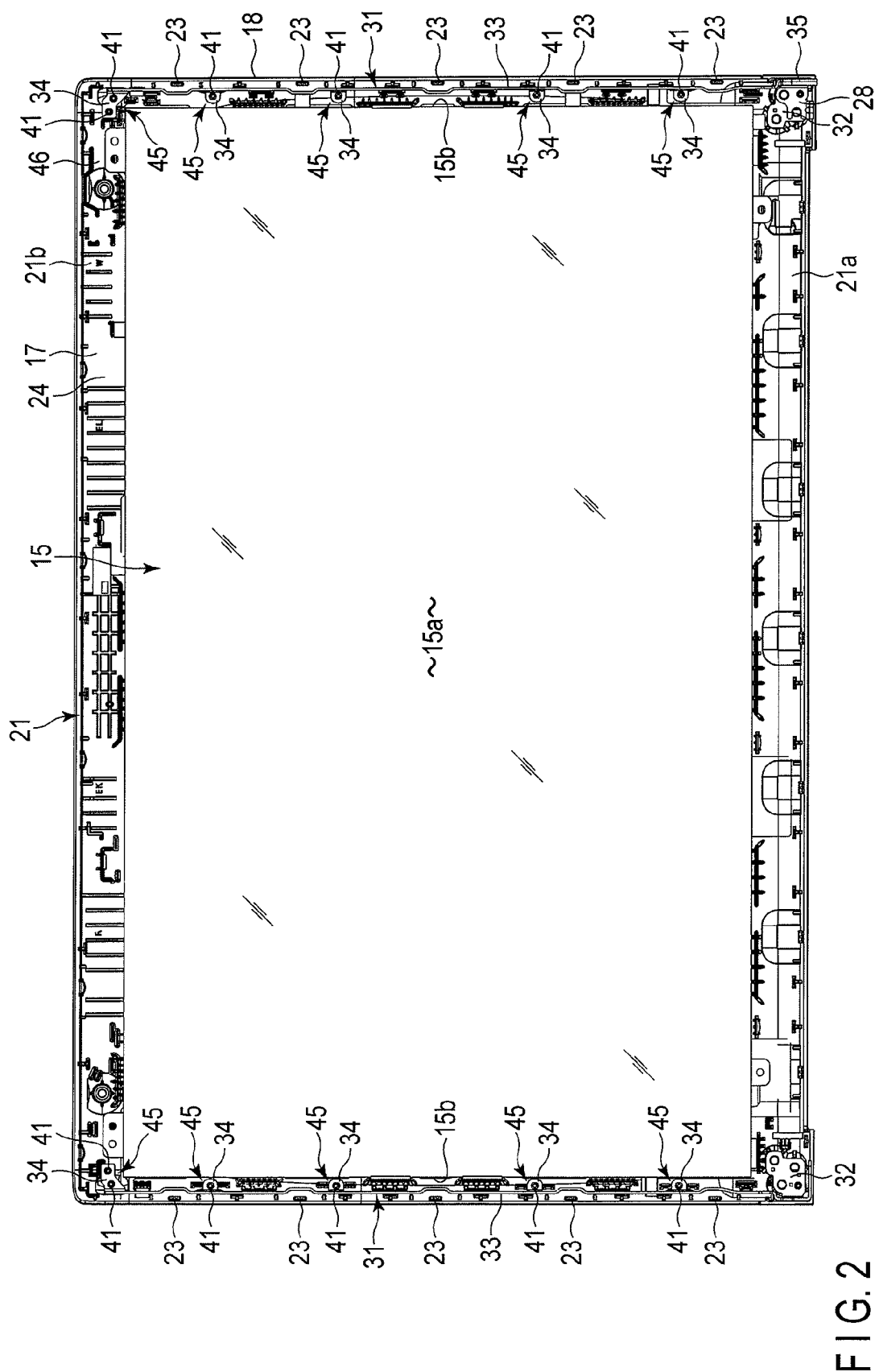
FIG. 2 is an exemplary plan view illustrating the inside of a display unit of the electronic apparatus illustrated in FIG. 1.

As illustrated in FIG. 2, the supporting metal members 31 are attached to the left and right end portions of the second housing 14 (hereinafter simply referred to as a housing 14), respectively. The supporting metal member 31 is an example of a "metal member", a "metal sheet", a "member", and a "supporting member". The supporting metal member 31 is accommodated in the housing 14.

The supporting metal member 31 is attached to the hinge 4a or 4b and extends from the hinge 4a or 4b into the housing 14 over substantially the entire width in the lateral direction of the housing 14. In addition, since the left and right supporting metal members 31 have substantially the same configuration and function, the right supporting metal member 31 will be described in detail as a representative example.

Figure 4:
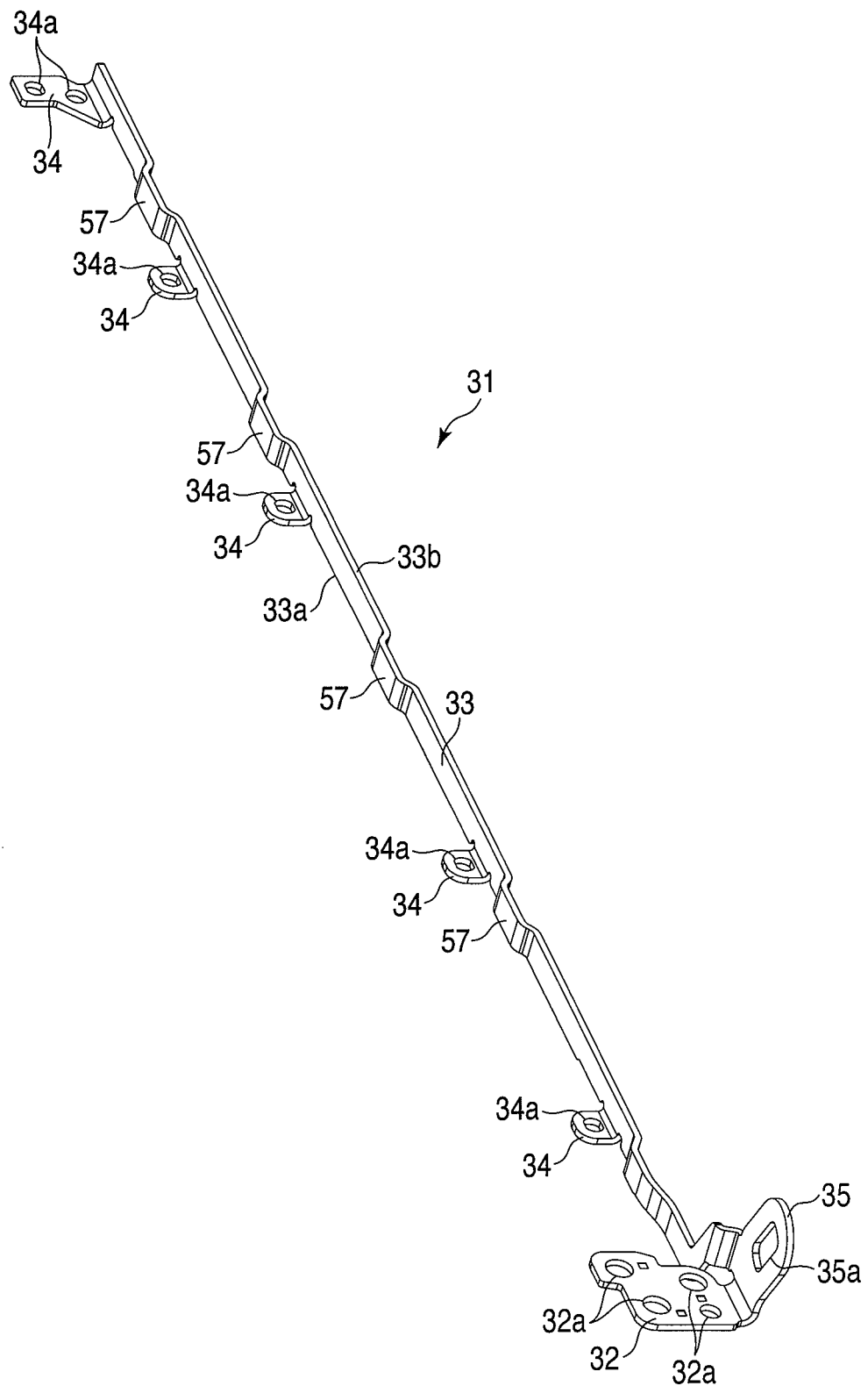
FIG. 4 is an exemplary perspective view of a supporting metal member illustrated in FIG. 3.

As illustrated in FIGS. 3 and 4, the supporting metal member 31 includes a base portion 32, a standing portion 33, an attaching portion 34, and a Kensington lock portion 35. The base portion 32 has a plate-like shape and overlaps the second bracket 28 of the hinge 4a or 4b. The base portion 32 includes a plurality of holes 32a in which screws 36 are inserted. The base portion 32 is fixed to the housing 14 by the screws 36 and the second bracket 28 of the hinge 4a or 4b.

The Kensington lock portion 35 is provided to be continuous to the base portion 32 and stands from the end portion of the base portion 32. The Kensington lock portion 35 includes an attaching hole 35a to which a Kensington lock is attached. Although not illustrated in the drawings, an attaching hole to which a Kensington lock is attached is also provided in the second bracket 28 of the hinge 4a. The attaching hole 35a of the supporting metal member 31 and the attaching hole of the second bracket 28 are similar in shape and are communicating with each other.

That is, the Kensington lock is inserted into the attaching hole 35a of the supporting metal member 31 and the attaching hole of the second bracket 28. The Kensington lock is received by the supporting metal member 31 and the second bracket 28.

As illustrated in FIGS. 3 and 4, the standing portion 33 stands substantially vertical to the back wall 17. The standing portion 33 extends over substantially the entire length of the supporting metal member 31 and over substantially the entire length in the lateral direction of the housing 14. The standing portion 33 includes a first end portion 33a facing the back wall 17 and a second end portion 33b disposed on a side opposite to the first end portion 33a.

The attaching portion 34 protrudes from the first end portion 33a of the standing portion 33. The attaching portion 34 has a plate-like shape and extends substantially in parallel to the back wall 17. The attaching portion 34 is on the back wall 17 and makes contact with the back wall 17. In other words, the supporting metal member 31 includes the attaching portion 34 and the standing portion 33 standing from the attaching portion 34 toward a side opposite to the back wall 17. A hole 34a is formed in the attaching portion 34.

Figure 5:
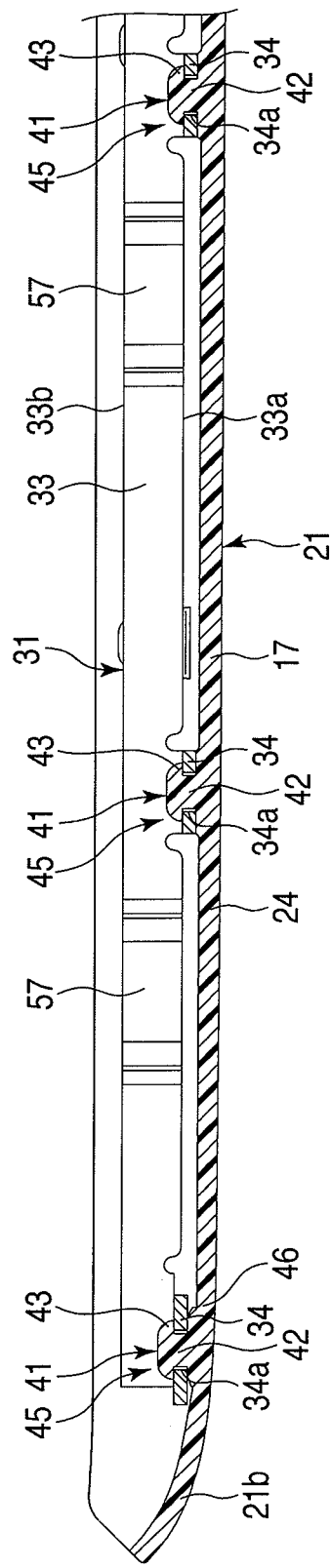
FIG. 5 is an exemplary cross-sectional view of the inside of the display unit taken along the line F5-F5 in FIG. 3.

As illustrated in FIGS. 5 and 11, the back wall 17 supports the attaching portion 34 of the supporting metal member 31 located on the back wall 17. A supporting portion 41 which protrudes from the back wall 17 more than at least a part of the supporting metal member 31 is formed on the back wall 17. The supporting portion 41 protrudes from the back wall 17 over the attaching portion 34 of the supporting metal member 31, for example.

Figure 6:
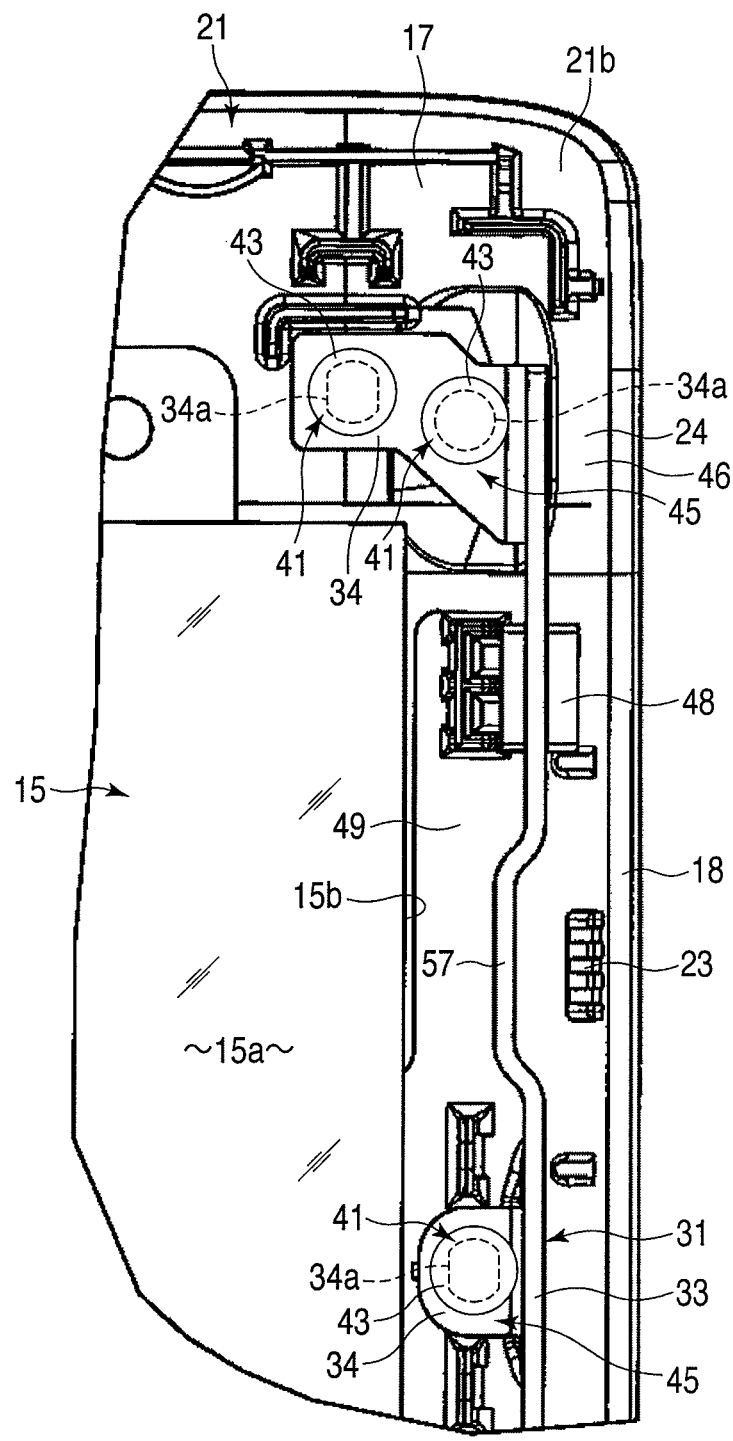
FIG. 6 is an exemplary plan view illustrating a region of the inside of the display unit surrounded by the line F6 in FIG. 3.

The supporting portion 41 is provided at the position corresponding to the hole 34a of the attaching portion 34. The supporting portion 41 is a protrusion protruding from the back wall 17. As illustrated in FIGS. 6 and 11, the supporting portion 41 is inserted into the hole 34a of the attaching portion 34 of the supporting metal member 31, and is heated and pressed so that the leading end thereof is crushed. That is, the supporting portion 41 is welded to the supporting metal member 31. In addition, in FIGS. 2, 3, and 9, the supporting portion 41 in a state before the leading end is crushed is illustrated.

As illustrated in FIGS. 6 and 11, the supporting portion 41 includes a protrusion 42 which protrudes from the back wall 17 and is inserted into the hole 34a of the attaching portion 34 of the supporting metal member 31 and a holding portion 43 (a retaining portion) of which the outer diameter increases at the leading end of the protrusion 42 and which broadens on the supporting metal member 31. The holding portion 43 makes contact with the supporting metal member 31 and supports the supporting metal member 31 from a side opposite to the back wall 17. The supporting metal member 31 is fixed to the housing 14 by being supported from both sides by the back wall 17 and the supporting portion 41.

In other words, at least part of the supporting metal member 31 is disposed closer to the back wall 17 than part of the supporting portion 41. As a specific example, the attaching portion 34 of the supporting metal member 31 is disposed closer to the back wall 17 than the leading end (the holding portion 43) of the supporting portion 41. The attaching portion 34 of the supporting metal member 31 is disposed between the back wall 17 and the holding portion 43 of the supporting portion 41 and is supported from both sides by the back wall 17 and the holding portion 43 of the supporting portion 41.

As illustrated in FIGS. 5 and 11, the supporting portion 41 is lower in height from the back wall 17 than the standing portion 33. Therefore, a space, in which other components such as a cable can be mounted, is present between the supporting portion 41 and the mask 22.

As illustrated in FIG. 3, the supporting metal member 31 is attached to the housing 14 by a plurality of fixing portions 45. At least one of the plurality of fixing portions 45 is in a side space (side region) of the display device 15. Each of the fixing portions 45 is formed by the back wall 17 and the supporting portion 41.

As illustrated in FIG. 5, the cover 21 includes a first end portion 21a and a second end portion 21b. The first end portion 21a is an end portion attached to the hinges 4a and 4b. The second end portion 21b is an end portion disposed on a side opposite to the hinges 4a and 4b. The cover 21 includes a curved surface portion 46 on the second end portion 21b. In the curved surface portion 46 (curved portion), the back wall 17 is formed in a curved surface shape that faces the inner side of the housing 14, and the housing 14 is thin. The supporting metal member 31 extends up to the curved surface portion 46 and is also fixed by at least one of the fixing portions 45 in the curved surface portion 46. That is, the supporting metal member 31 is fixed to the curved surface portion 46 by the back wall 17 and the supporting portion 41.

Since the supporting metal member 31 is attached to the housing 14, it is possible to improve the strength of the housing 14 and to suppress stress from being concentrated on the hinges 4a and 4b. By providing the supporting metal member 31, it is possible to improve the strength of the hinges 4a and 4b with respect to stress in the rotational direction of the display unit 3.

As illustrated in FIG. 6, a conductive gasket 48 is interposed between the supporting metal member 31 and the inner surface of the housing 14. Thus, the supporting metal member 31 is electrically connected to a ground portion 49 on the inner surface of the housing 14. The supporting metal member 31 makes surface-contact with the hinges 4a and 4b. The supporting metal member 31 is electrically connected to the main unit 2 through the hinges 4a and 4b. Thus, the ground portion 49 on the inner surface of the housing 14 is grounded to the main unit 2 through the supporting metal member 31. In addition, the ground portion 49 may be a metal foil on the inner surface of the housing 14 or may be a plating film or a conductive coating on the inner surface of the housing 14, and the kind thereof is not particularly limited.

As illustrated in FIGS. 3 and 13, the cover 21 includes the engaging portion 23 engaging with the mask 22. The engaging portion 23 is provided on an end portion of the cover 21, and is provided, for example, on the circumferential wall 18. As illustrated in FIGS. 3, 6, 7, 12, and 13, the supporting metal member 31 is separated from the display device 15 and is fixed to the housing 14 independently from the display device 15. The supporting metal member 31 is attached to the housing 14 at a position between the display device 15 and the engaging portion 23. In other words, the supporting metal member 31 is attached to the housing 14 at a position between the display device 15 and the circumferential wall 18.

As illustrated in FIG. 8, a camera module (not illustrated), an antenna 50, and cables 51 that are connected to the camera module and the antenna 50 are provided in the housing 14. The cables 51 are wound along the side surface 15b of the display device 15 and extend into the main unit 2 through the hinges 4a and 4b.

The cables 51 are inserted between the display device 15 and the supporting metal member 31. The cables 51 are disposed farther from the engaging portion 23 than the supporting metal member 31. That is, the supporting metal member 31 is provided between the cables 51 and the engaging portion 23, and movements of the cables 51 are regulated by the supporting metal member 31 so that the cables 51 do not approach the engaging portion 23.

As illustrated in FIG. 11, the cable 51 overlaps the attaching portion 34 of the supporting metal member 31 and the supporting portion 41 of the cover 21 in the thickness direction of the housing 14. The standing portion 33 includes the first end portion 33a attached to the attaching portion 34 and the second end portion 33b disposed on the side opposite to the first end portion 33a. At least part of the cable 51 is disposed closer to the back wall 17 than the second end portion 33b of the standing portion 33.

As illustrated in FIG. 8, a plurality of ribs 53, 54, and 55 are provided on the inner surface of the housing 14. The first and second ribs 53 and 54 are temporary fixing ribs of the supporting metal member 31. The supporting metal member 31 is temporarily fixed when the supporting portion 41 before welding is inserted into the hole 34a of the attaching portion 34 and disposed between the first and second ribs 53 and 54. Moreover, the supporting metal member 31 is on a machine in a state of being supported by the first and second ribs 53 and 54, and the leading end of the supporting portion 41 is crushed. Thereafter, the supporting portion 41 is further heated and pressed, whereby the supporting metal member 31 is welded to the housing 14.

The supporting metal member 31 includes a pressing portion 57 which is disposed at the position corresponding to the engaging portion 23 and is a protrusion toward the cable 51. The pressing portion 57 is provided by bending the supporting metal member 31 in a direction away from the engaging portion 23. Thus, as illustrated in FIG. 9, the distance between the cover 21 and the supporting metal member 31 increases near the engaging portion 23, and the engaging portion 22a of the mask 22 easily engages with the engaging portion 23 of the cover 21.

Figure 9:
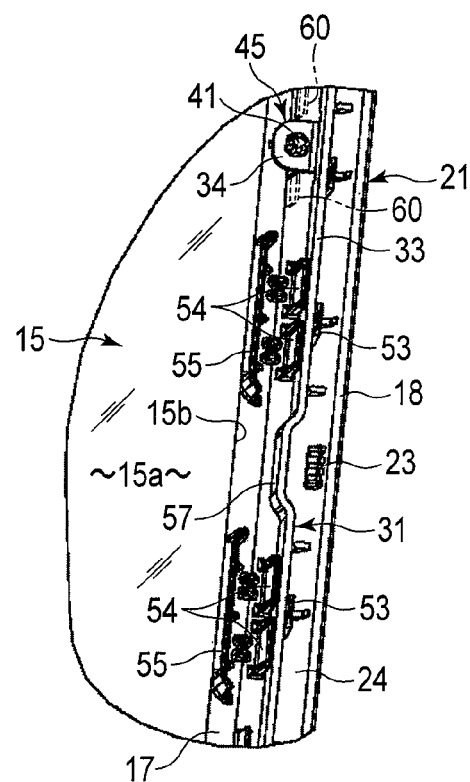
FIG. 9 is an exemplary perspective view illustrating a region of the inside of the display unit surrounded by the line F9 in FIG. 3.

As illustrated in FIG. 9, the third rib 55 and the pressing portion 57 of the supporting metal member 31 are provided alternately. The third rib 55 is an example of a supporting portion supporting the display device 15 with an elastic member 58 disposed therebetween and an example of a receiving portion receiving the cable 51. The third rib 55 is provided between the cable 51 and the display device 15.

Figure 10:
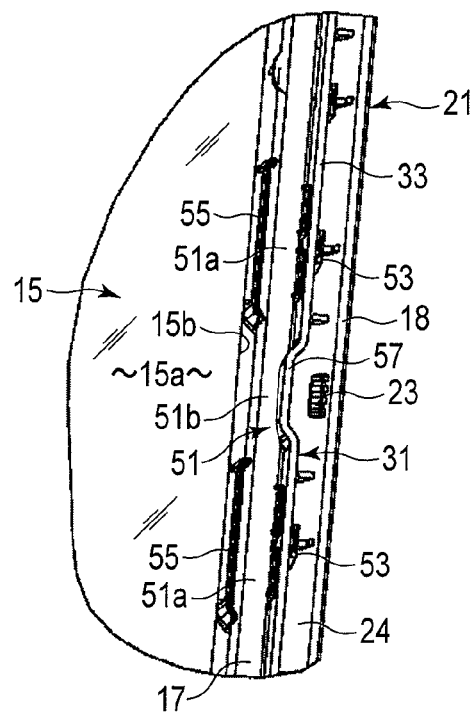
FIG. 10 is an exemplary perspective view illustrating a state in which a cable is attached to the inside of the display unit illustrated in FIG. 9.
Figure 16:
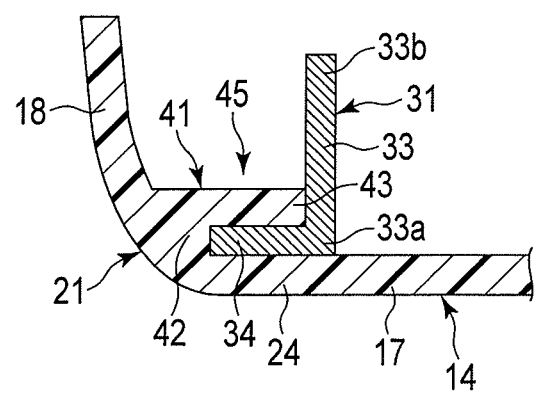
FIG. 16 is an exemplary cross-sectional view illustrating a third modification of the electronic apparatus according to one embodiment.
Figure 17:
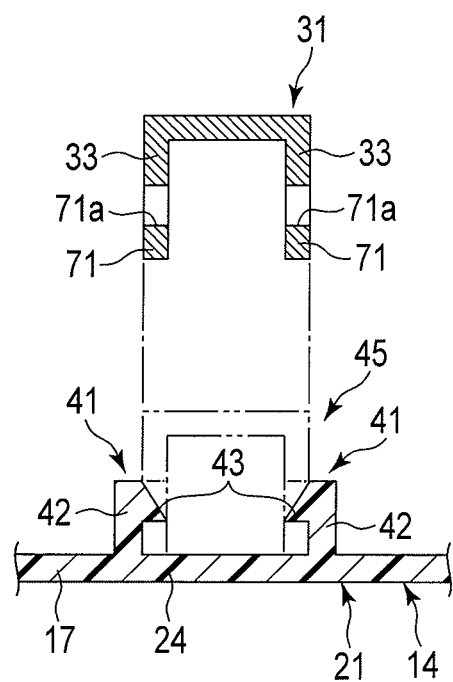
FIG. 17 is an exemplary cross-sectional view illustrating a fourth modification of the electronic apparatus according to one embodiment.

As illustrated in FIG. 10, the pressing portion 57 of the supporting metal member 31 protrudes toward the cable 51 and presses a portion of the cable 51 so that another portion of the cable 51 is pressed against the third rib 55.

More specifically, the cable 51 includes a first portion 51a facing the third rib 55 and a second portion 51b away from the third rib 55 and facing the pressing portion 57 of the supporting metal member 31. The pressing portion 57 of the supporting metal member 31 presses the second portion 51b in a direction where the first portion 51a of the cable 51 is pressed against the third rib 55. Thus, the cable 51 is pinched between the third rib 55 and the supporting metal member 31, whereby the movement thereof is regulated. In other words, the cable 51 is pressed and bent by the pressing portion 57 of the supporting metal member 31, and a part of the cable 51 is caught on the edge portion of the third rib 55. In this way, the movement of the cable 51 is regulated.

In addition, fourth ribs 60 as illustrated in FIG. 9 may be provided. The fourth ribs 60 are provided so as to be divided on both sides of the supporting portion 41, respectively. The supporting portion 41 has a height of some extent even when the leading end thereof is crushed. Although a plurality of cables 51 are inserted in the housing 14, the thickness becomes relatively large if the plurality of cables 51 overlap right on the apex portion of the supporting portion 41.

In such a case, by inserting the plurality of cables 51 to be divided on both left and right sides of the fourth rib 60, it is possible to prevent the plurality of cables 51 from overlapping right on the apex portion of the supporting portion 41. The first to fourth ribs 53, 54, 55, and 60 may not be provided, according to necessity.

According to such a configuration, it is possible to provide the electronic apparatus 1 ideal for decreasing the thickness.

For comparison, a description is made about a case in which the supporting metal member is attached to the housing by screwing. In this case, although a boss having a screw hole is provided on the housing, the boss necessarily has a relatively large height in order to secure a screw hole having a depth of some extent. Such a boss makes it difficult to decrease the thickness of the housing.

On the other hand, in the present embodiment, the housing 14 includes the wall 24 supporting the supporting metal member 31 and the supporting portion 41 supporting the supporting metal member 31 from the side opposite to the wall 24. That is, at least a part of the supporting metal member 31 is supported from both sides by the wall 24 and the supporting portion 41, whereby the supporting metal member 31 is attached to the housing 14 without using a screw. Therefore, a screwing boss is not necessary, and this allows a decrease in the thickness of the housing 14.

In addition, according to the above configuration, the attaching portion 34 of the supporting metal member 31 can be closely attached to the wall 24. If the supporting metal member can be attached to the housing 14 using the attaching portion 34 closely attached to the wall 24, it is possible to attach the supporting metal member 31 to a thin portion of the housing 14.

Furthermore, for comparison, an example of the attachment structure of the supporting metal member is illustrated in FIG. 19. In the structure of FIG. 19, a supporting metal member 101 is fixed to the side surface of a display device 102 by screwing. In this structure, there is a first fact in that the display device 102 needs to have a thickness sufficient for screwing, and there is a limit in decreasing the thickness of the display device 102. A second fact is that the cable 106 may be pinched between the engaging portion 105 of the cover 104 and the engaging portion 107 of the mask 103 when the mask 103 is attached to the cover 104.

More specifically, the engaging portion 105 for engaging with the mask 103 is formed on the end portion of the cover 104. In the structure of FIG. 19, since the supporting metal member 101 is closely attached to the display device 102, the cables 106 are unable to be inserted between the supporting metal member 101 and the display device 102 but are inserted between the supporting metal member 101 and the engaging portion 105. Thus, the cables 106 tend to be disposed near the engaging portion 105, and there is a possibility that the cable 106 is pinched between the engaging portion 105 of the cover 104 and the engaging portion 107 of the mask 103, when the cover 104 and the mask 103 are combined with each other.

On the other hand, in the present embodiment, as illustrated in FIG. 13, the supporting metal member 31 is separated from the display device 15 and is attached to the casing 14 at a position between the display device 15 and the engaging portion 23. Thus, (1) it is advantageous in that no screw hole is necessary on the side surface of the display device 15, and thus the thickness of the display device 15 can be decreased; and (2) it is advantageous in that since a gap through which the cable 51 can be inserted is provided between the display device 15 and the supporting metal member 31, the cable 51 can be disposed farther from the engaging portion 23 than the supporting metal member 31. Thus, since the cables 51 are distant from the engaging portion 23, and the supporting metal member 31 is present between the cables 51 and the engaging portion 23, the cables 51 are suppressed from being pinched between the engaging portion 23 of the cover 21 and the engaging portion 22a of the mask 22 when the cover 21 and the mask 22 are combined.

In the present embodiment, the supporting metal member 31 includes the attaching portion 34 extending substantially in parallel to the wall 24 and the standing portion 33 standing from the attaching portion 34 toward the side opposite to the wall 24. The supporting portion 41 is lower in height from the wall 24 than the standing portion 33. That is, the supporting portion 41 is relatively small, and the entire fixing structure formed by the wall 24 and the supporting portion 41 is received in the vicinity of the wall 24. Therefore, a space in which other components such as the cable 51 can be accommodated is present between the supporting portion 41 and the mask 22. This contributes to decreasing the thickness of the housing 14 and increasing the mounting density.

In the present embodiment, the cable 51 overlaps the attaching portion 34 of the supporting metal member 31 in the thickness direction of the housing 14. At least a part of the cable 51 is closer to the wall 24 than the second end portion 33b of the standing portion 33. That is, at least a part of the cable 51 is received within the height range of the standing portion 33 of the supporting metal member 31. According to this configuration, it is possible to further decrease the thickness of the housing 14.

In the present embodiment, the supporting metal member 31 is fixed by the plurality of fixing portions 45. At least one of the plurality of fixing portions 45 is in the side space of the display device 15. If the fixing portion 45 is present in the side space of the display device 15, the supporting metal member 31 can be more tightly attached to the housing 14. With such a fixing structure as in the present embodiment, since it takes less time and labor than the screwing, it is possible to easily increase the number of fixing portions 45. In addition, if the number of fixing portions 45 can be increased, strain of the supporting metal member 31 itself can be decreased. In the present embodiment, the supporting portion 41 is welded to the supporting metal member 31. According to this configuration, it is possible to collectively fix the plurality of fixing portions 45.

In the present embodiment, the cover 21 includes the third rib 55 provided between the cable 51 and the display device 15. The supporting metal member 31 includes the pressing portion 57 which protrudes toward the cable 51 and presses the cable 51 so as to be pressed against the third rib 55.

According to this configuration, the cable 51 is supported by the supporting metal member 31, and the structure for fixing the cable 51 can be eliminated or reduced in size. Thus, it is possible to decrease the thickness of the housing 14 and decrease the number of components. Moreover, the possibility of the cable 51 being pinched between the mask 22 and the cover 21 decreases.

In the present embodiment, the pressing portion 57 is provided so as to correspond to the engaging portion 23, and is formed by bending the supporting metal member 31 in a direction away from the engaging portion 23. With this configuration, the distance between the cover 21 and the supporting metal member 31 increases near the engaging portion 23. Thus, the engaging portion 22a of the mask 22 can easily engage with the engaging portion 23 of the cover 21. In other words, by bending a part of the supporting metal member 31 at the position corresponding to the engaging portion 23, it is possible to decrease the width of the housing 14.

In the present embodiment, the curved surface portion 46 is formed at the end portion of the cover 21. The supporting metal member 31 extends up to the curved surface portion 46 of the cover 21 and is fixed to the curved surface portion 46 by the wall 24 and the supporting portion 41. By using the fixing structure formed by the wall 24 and the supporting portion 41, it is possible to attach the supporting metal member 31 to the housing 14 in a thin portion of the housing 14 like the curved surface portion 46. With this configuration, it is possible to increase the length of the supporting metal member 31 and to further improve the strength of the housing 14.

Next, several modifications will be described.

FIGS. 14 to 17 illustrate several modifications of a fixing structure for fixing the supporting metal member 31. Configurations having the same or similar functions as those of the configurations of the above-described embodiment will be denoted by the same reference numerals, and description thereof will not be repeated. Configurations other than those described below are the same as those of the embodiment.

The electronic apparatus 1 illustrated in FIGS. 14 to 17 includes a supporting metal member 31 attached to a hinge 4a and a housing 14 in which the supporting metal member 31 is accommodated. The housing 14 includes a wall 24 supporting the supporting metal member 31 and a supporting portion 41 protruding from the wall 24 and supporting the supporting metal member 31 from the side opposite to the wall 24. The supporting portion 41 illustrated in FIGS. 14 to 17 is not welded. The supporting metal member 31 is fixed by being engaged (e.g., fitted) between the wall 24 and the supporting portion 41, for example.

According to such a structure, the supporting metal member 31 is attached to the housing 14 without using a screw. Therefore, a screwing boss is not necessary, and the thickness of the housing 14 can be decreased.

According to another aspect, an electronic apparatus according to an embodiment includes a housing including a wall and a protrusion on the wall, a hinge attached to the housing, and a member attached to the hinge and including a fixing portion fixed to the housing. At least a part of the fixing portion is disposed closer to the wall than a part of the protrusion and is engaged with the protrusion.

As an example of the electronic apparatus, for example, the fixing structure illustrated in FIG. 14 includes a housing 14 including a wall 24 and a protrusion (the supporting portion 41) on the wall 24, a hinge 4a attached to the housing 14, and a member (the supporting metal member 31) attached to the hinge 4a and including a fixing portion 71 fixed to the housing 14. At least a part of the fixing portion 71 is disposed closer to the wall 24 than a part of the protrusion (the supporting portion 41) and is engaged with the protrusion (the supporting portion 41).

More specifically, the fixing portion 71 includes a hole 71a. The fixing portion 71 is squeezed into the protrusion (the supporting portion 41) by pressing, for example. If the protrusion 42 is inserted into the hole 71a so that the fixing portion 71 is engaged with and fixed to the protrusion 42, the portion (for example, the holding portion 43) supporting the supporting metal member 31 from the side opposite to the wall 24 is not necessary.

According to such a structure, the supporting metal member 31 is attached to the housing 14 without using a screw. Therefore, a screwing boss is not necessary, and the thickness of the housing 14 can be decreased.

Figure 18:
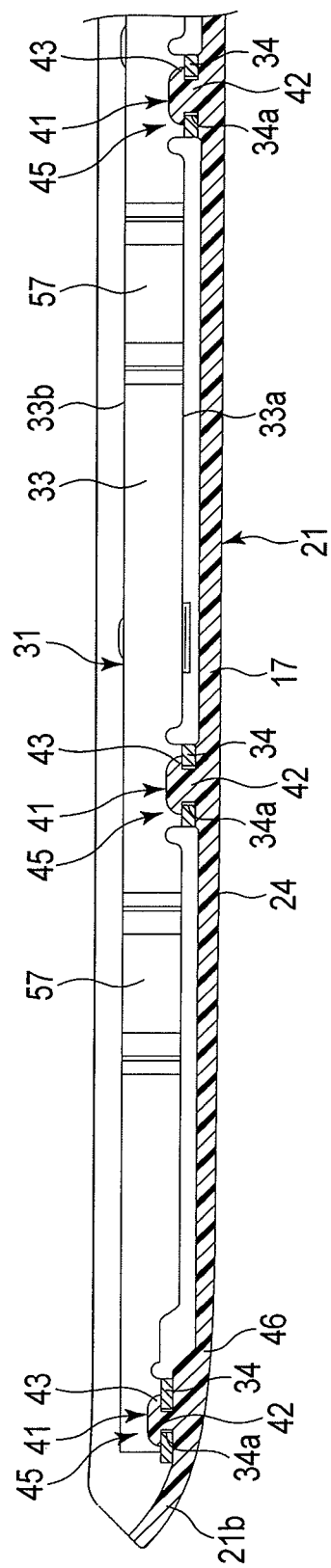
FIG. 18 is an exemplary cross-sectional view illustrating a fifth modification of the electronic apparatus according to one embodiment.

FIG. 18 illustrates another modification. As illustrated in FIG. 18, a supporting metal member 31 may be attached to a curved surface portion 46 having a relatively large curvature, of a cover 21. The supporting metal member 31 extends up to the vicinity of the end portion of the cover 21 over the bending start portion of the cover 21.

The embodiment is not limited to the embodiments described above but may be realized by modifying constituent elements in the implementing stage within a range without departing from the spirit of the invention. Moreover, various embodiments can be made by appropriately combining a plurality of constituent elements disclosed in the embodiments described above. For example, some constituent elements may be eliminated from all the constituent elements disclosed in the embodiments. Furthermore, constituent elements in different embodiments may be combined appropriately.

For example, the housing may not include a curved surface portion. The pressing portion of the metal member may not be provided at the position corresponding to the engaging portion. The supporting portion may not be fixed by welding. The metal member may not be attached in the side space of the module. The cable may not be inserted between the module and the metal member. The member attached to the hinge is not limited to the metal member but may be formed of other materials. The supporting portion and the wall may not be provided in a part of the cover but may be provided on the mask or other members.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a module;
   a housing comprising a first member and a second member, the first member facing the module, the second member facing the module from a side opposite to the first member, the second member comprising an engaging portion configured to engage with the first member;
   a hinge attached to the housing;
   a metal member in the housing attached to the hinge; and
   a cable in the housing,
   wherein the second member comprises a wall configured to support the metal member and a supporting portion protruding from the wall,
   wherein the supporting portion is configured to support the metal member from a side opposite to the wall, wherein the metal member is separated from the module and configured to be attached to the housing at a position between the module and the engaging portion, and wherein the cable is between the module and the metal member, the cable farther from the engaging portion than the metal member.

2. The electronic apparatus of claim 1, wherein the metal member comprises a first portion and a second portion, the first portion extending substantially parallel to the wall and attached to the wall by the supporting portion, the second portion standing from the first portion to a side opposite to the wall, and the supporting portion projects from the wall less than the second portion.

3. The electronic apparatus of claim 2, wherein the cable is configured to overlap the first portion in a thickness direction of the housing, the second portion comprises a first end connected to the first portion and a second end opposite to the first end, and at least a portion of the cable is closer to the wall than the second end is.

4. The electronic apparatus of claim 1, wherein the metal member is configured to be attached to the housing by a plurality of fixing portions, and at least one of the plurality of fixing portions comprises the wall and the supporting portion, the supporting portion in a side space of the module.

5. The electronic apparatus of claim 1, wherein the supporting portion is welded to the metal member.

6. The electronic apparatus of claim 1, further comprising a receiver between the cable and the module, wherein the metal member comprises a pressing portion protruding toward the cable, the pressing portion configured to press the cable against the receiver.

7. The electronic apparatus of claim 6, wherein the pressing portion corresponds to the engaging portion, the pressing portion provided by bending the metal member in a direction away from the engaging portion.

8. The electronic apparatus of claim 1, wherein an end of the second member comprises a curved portion, and the metal member extends to the curved portion and is configured to be attached to the curved portion by the supporting portion.

* * * * *